May 1, 1923.

C. E. HEDRICK

POULTRY DIPPING MACHINE

Filed Dec. 15, 1921

1,453,674

Inventor
Clarence Elliott Hedrick

Patented May 1, 1923.

1,453,674

UNITED STATES PATENT OFFICE.

CLARENCE ELLIOTT HEDRICK, OF NEWTON, KANSAS.

POULTRY-DIPPING MACHINE.

Application filed December 15, 1921. Serial No. 522,687.

*To all whom it may concern:*

Be it known that I, CLARENCE ELLIOTT HEDRICK, a citizen of the United States, residing at Newton, in the county of Harvey and State of Kansas, have invented a new and useful Poultry - Dipping Machine, of which the following is a specification.

My invention relates to poultry dipping devices and has reference more particularly to such devices as are used in connection with a poultry house and a tank containing the dipping fluid.

An object of the invention is to provide means for removing vermin and scale from the body and legs of fowls.

Another object of the invention is to provide means for automatically dipping the poultry and thereby relieving the caretaker of the tedious method of catching and dipping the fowls.

With these and other objects in view the invention consists in providing a runway of box like structure adapted to be put in communication with the outlet of a poultry house and provided with a hinged bottom which will automatically drop the poultry into the germicidal fluid by the weigth of the poultry thereon.

The invention consists further in the particular construction, arrangement, and combination of parts as will be hereinafter more fully described and pointed out in the claims, reference being had to the accompanying drawings in which:

Figure 1:
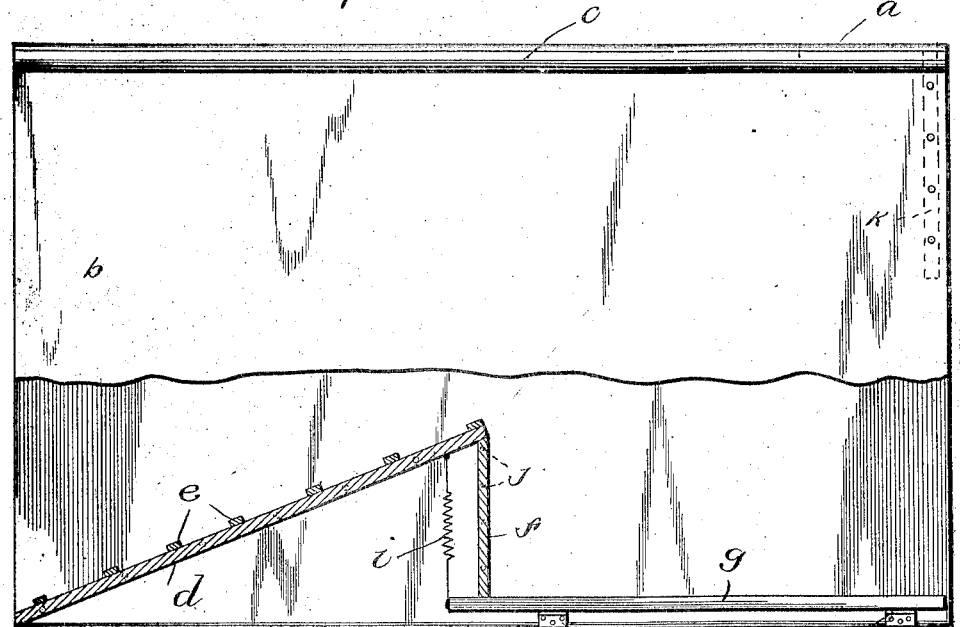
Figure 1 is a side elevation, partly in section of the device.

In carrying out my invention I provide a runway, one end of which is to be placed against the outlet of the poultry house, and which comprises a long narrow box-like structure consisting of a top, two sides, one open end, an inclined floor and a divided or sectional floor through which the fowls drop into the vessel containing the dipping fluid, and which is placed immediately beneath such floor.

Referring more specifically to the drawing, *a* indicates the top or cover, *b* the sides which are connected with the top *a* by the rolled joint *c* the lower ends of the sides being also rolled as shown: this will afford a good support for the device and also strengthens the side walls.

At the entrance end of the device an inclined floor or ramp *d* is held between the side walls by nails or other suitable means and is also provided with the transverse cleats or treads *e* to provide a foothold for the fowls on the incline. At its upper end the ramp or inclined floor *d* is supported by a transverse partition *f*, which is located at about the longitudinal center of the complete device thus dividing the box into front and rear portions.

Figure 2:
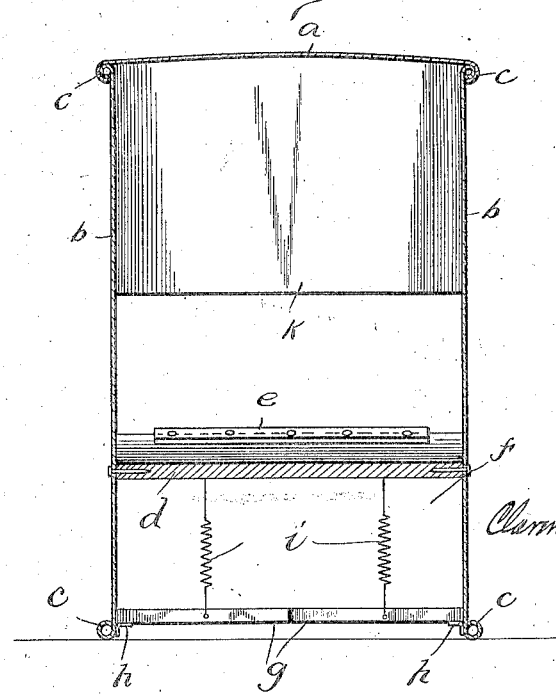
Figure 2 is a vertical transverse section of same.

The reference characters *g* designate two doors constituting floor sections which are hinged at their opposite longitudinal edges within the box and to the side walls at the bottom thereof as indicated by *h* in both Figures 1 and 2 thus providing a divided floor. These sections extend from the rear end of the box beneath the partition *f* and beyond the same into the housing formed by the ramp or inclined floor section *d*, and are held up against the partition *f* by the helical springs *i* as plainly seen in Figures 1 and 2, the springs being connected to the floor sections *g* at the ends within the housing just referred to the upper ends of the springs being connected to the underside of the inclined floor section.

While both ends of the box are practically open the rear end is provided with the closed portion *k* which is just in advance of the top of the inclined floor and acts as a barrier to prevent the fowl from passing through the box without touching the hinged floor sections.

In other words the element *k* forms a vertical baffle which will act to force fowl into the rear end of the runway and upon the hinged sections *g*.

The operation of the device is as follows:

The device is placed with the end having the ramp *d* covering an outlet window of the poultry house, and a tub or tank containing the dipping fluid which is usually a disinfectant or germicide, is placed beneath the same.

The fowl now leaving the poultry house will run up inclined floor *d* and on reaching the top end will be forced over the edge into the rear portion and onto the sectional floor. The weight of the fowl will overcome the pull of springs $i$ which need only be strong enough to hold the hinged sections in horizontal position, and cause the floor to divide along the center, and the doors $g$ to swing downwardly and to opposite sides. The fowl will thus be dropped into the dipping fluid and automatically dipped.

The function of the hinges $h$ is to support the floor sections on the side walls, and to permit them to be readily swung back by the springs $i$ to a horizontal position beneath the transverse partition $f$ as shown in Figure 1.

It will be noted that the ends of these floor sections $g$ extend beyond the partition $f$, so that the springs $i$ which actuate them are within the housing formed by the sides and the inclined floor $d$. The springs and their connections will thus be protected.

The device as a whole may be made any size desired, and various parts may be of metal, or other suitable material, though metal for the top and sides is preferred as it permits of the ready connection by the rolled joint $c$.

From the above it will be understood that I provide simple, cheap and useful means for the dipping of poultry for the purpose of removing vermin and scale from the body and legs, and by which the fowls may be wholly immersed if desired without injuring them by rough handling.

As the fowls are compelled to pass through the device as they leave the poultry house, and as they hop or drop from the upper end of the inclined floor upon the sectional floor, the dipping is done automatically by the fowls dropping into the tank of dipping fluid positioned beneath the device.

Having thus described my invention, what I claim and desire to secure by Letter Patent is:

1. A poultry dipping device comprising in combination with a dipping tank, a box like structure consisting of side and top walls, and having one end entirely open and the opposite end closed at its upper portion by a transverse wall, the front portion having a stationary inclined floor, the rear portion having a sectional floor consisting of sections hingedly connected at their outer edges with said side walls and their opposing edges meeting in the center, a transverse partition separating the inclined floor portion from the sectional floor portion, said sections extending beneath and beyond said partition, and springs connected at one end to the said ends of said doors or sections, and at their other ends to the underside of said inclined floor section.

2. In a device for dipping poultry, a runway adapted to be applied to a poultry house and supported over a dipping tank, said runway comprising a box like structure consisting of closed top and side walls, a transverse partition dividing the same into front and rear halves, an inclined floor section in the front half supported at its upper end on said partition, a pair of doors or sections supported on the side walls within the rear half and adapted to open downwardly and away from each other by the weight of the poultry thereon, a baffle partition partly closing the rear end of the runway, and means for holding the doors in their closed position said means also serving to return the doors, when swung open.

CLARENCE ELLIOTT HEDRICK.

Witnesses:
ZELMA WINGER,
DAISY E. COBLE.